UNITED STATES PATENT OFFICE.

WILLIAM M. BRADSHAW, OF WILKINSBURG, PENNSYLVANIA, ASSIGNOR TO WESTINGHOUSE ELECTRIC AND MANUFACTURING COMPANY, A CORPORATION OF PENNSYLVANIA.

POLYPHASE ELECTRIC METER.

1,181,207.   Specification of Letters Patent.   Patented May 2, 1916.

Application filed June 6, 1911. Serial No. 631,575.

*To all whom it may concern:*

Be it known that I, WILLIAM M. BRADSHAW, a citizen of the United States, and a resident of Wilkinsburg, in the county of Allegheny and State of Pennsylvania, have invented a new and useful Improvement in Polyphase Electric Meters, of which the following is a specification.

My invention relates to polyphase wattmeters, and it has for its object to provide means whereby the torques exerted upon the movable member of a wattmeter by the different phase-elements or actuating parts thereof may be readily and simultaneously adjusted.

A further object of my invention is to provide means whereby the element or actuating part pertaining to one phase may be prevented from influencing or affecting the accuracy of operation of the actuating part pertaining to another phase.

The first of the above-specified objects is attained by providing a common support for the load magnets pertaining to all of the phases or actuating elements of the meter, which support is relatively adjustable with respect to a common support for all of the potential magnets of the meter. This permits of simultaneously varying the widths of the several air-gaps in which the disks or movable elements of the meter operate and thus provides for greater convenience and accuracy of adjustment.

The second object of my invention is attained by providing a magnetic barrier between the elements or actuating parts pertaining to the different phases.

Figure 1:
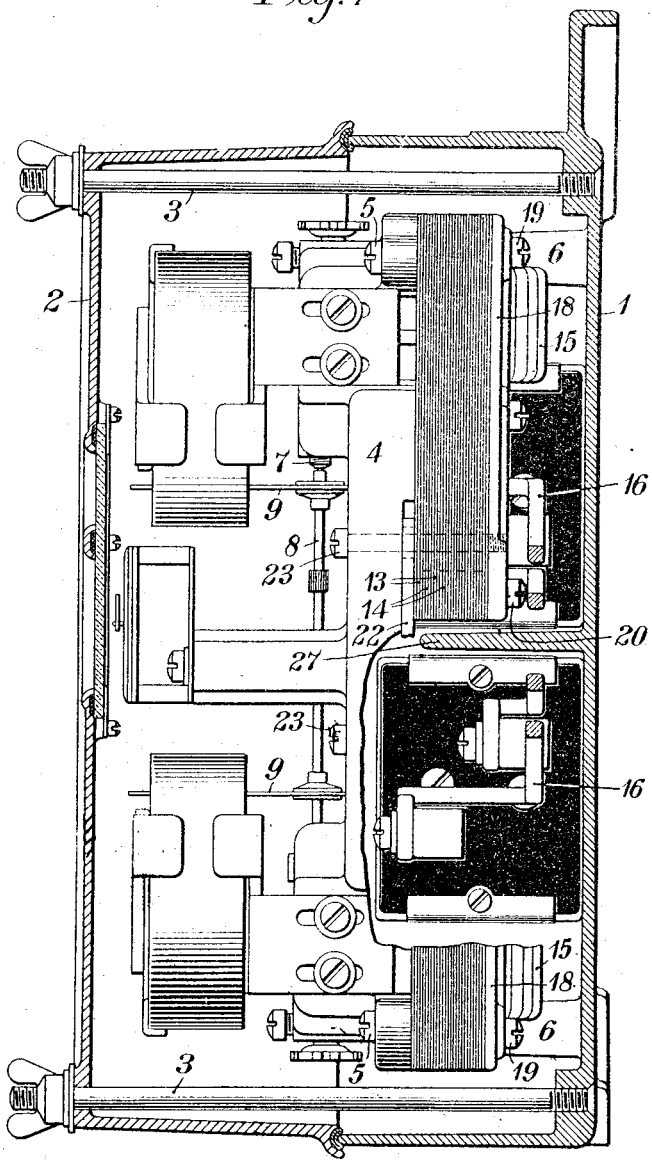
Figure 2:
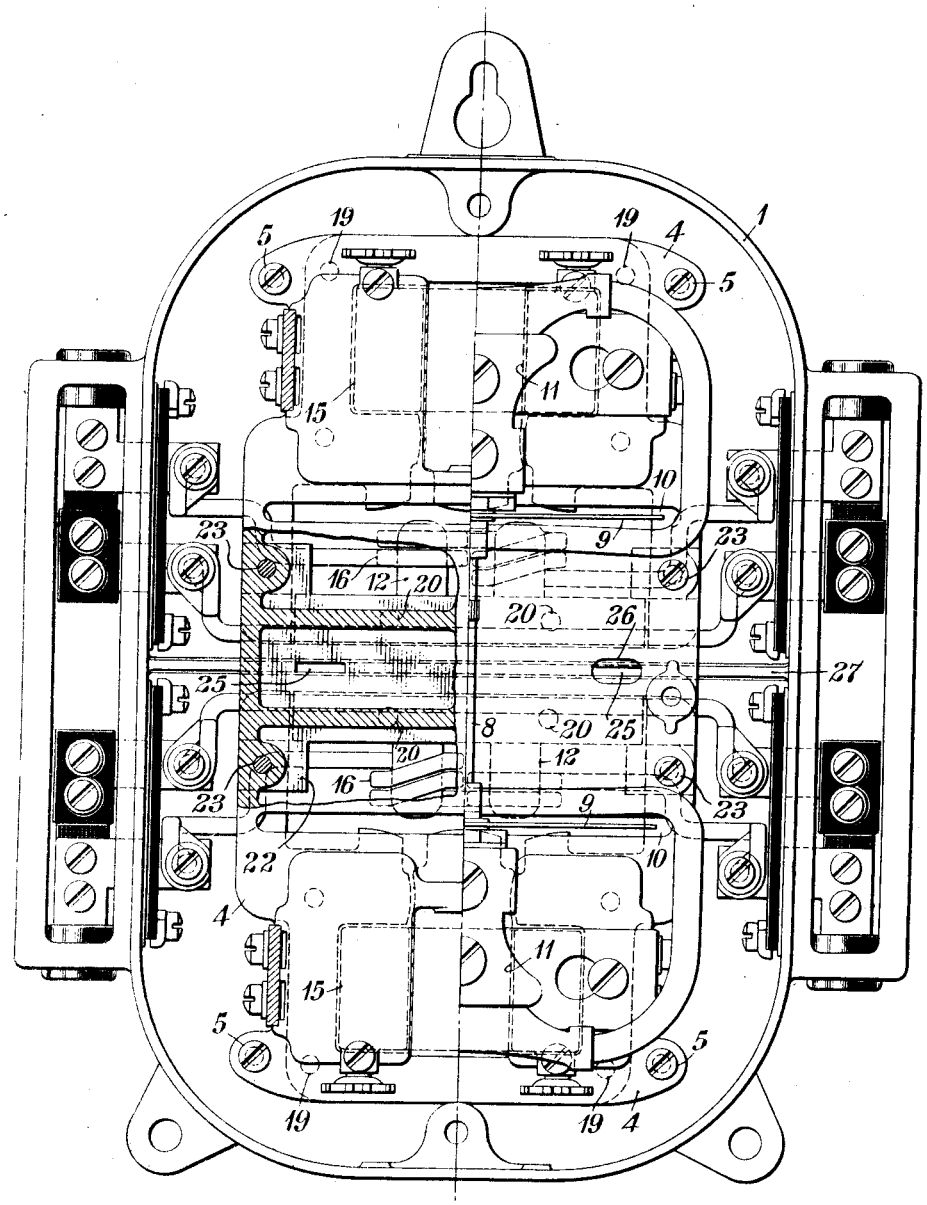
Figure 3:
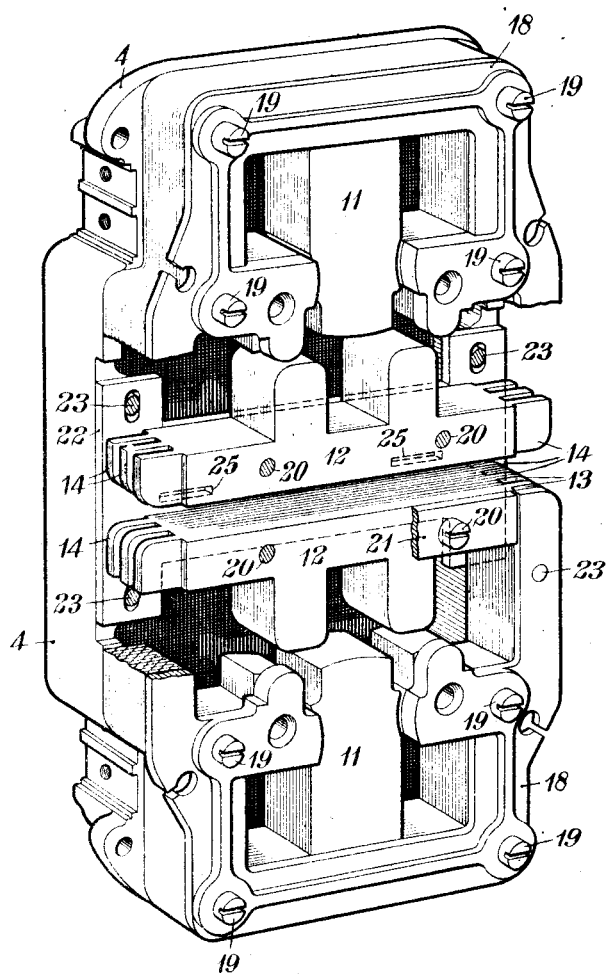

Figure 1 of the accompanying drawing is a side and sectional view of a meter that embodies my invention. Fig. 2 is a front and sectional view of the meter of Fig. 1 with its cover removed, and Fig. 3 is a view, in perspective and in section, of the rear of some of the parts of the movement of the meter.

The operating parts of the meter are inclosed within a casing, comprising a back member or base 1 and a cover 2 that is secured to the base by means of bolts 3, and the said operating parts are carried by a main frame 4 that is secured, by means of tap screws 5, to lugs or posts 6 formed integral with the base 1. The frame 4 is provided, in front, with bearings 7 for a shaft 8 upon which are mounted two armature disks 9 that project through slots 10 in the frame 4 and into air-gaps between the poles of potential and load magnets 11 and 12, respectively, which constitute the actuating means therefor. The meter consists of two complete single-phase movements that are separate and independent of each other except for the mechanical connection between their disks 9, and each of the movements is substantially like that set forth in Patent No. 853,218, granted to the Westinghouse Electric & Manufacturing Company upon an application filed by me. In the present instance, however, the potential and load magnets are provided with extensions 13 and 14, respectively, that dovetail together, though the said magnets are relatively adjustable. The potential magnets are, of course, so called because they carry the potential windings 15 that are adapted to be connected between the conductors of the circuit with respect to which the meter makes measurements, and the load magnets are so called because they are provided with coils 16 that are adapted to be connected in series with conductors of the said circuit.

The potential magnets are clamped, by means of tap screws 19, between the frame 4 and comparatively rigid side plates 18, and the load magnets are clamped, by means of tap screws 20, between comparatively rigid side plates 21 and an I-shaped plate 22 that is set in a recess in the rear face of the frame 4. The plate 22 and the attached load magnets 12 are retained in position by means of tap screws 23 that extend from the front of the frame 4, through the same and the parts 22 and 12, and are threaded in the extended ends of the side plates 18 for the potential magnets.

In order to permit of adjustment of the plate 22 and the parts carried thereby with respect to the frame 4 and the parts which it carries, the said plate is provided with slots through which the screws 23 extend, the said screws serving as means for clamping the said plate and load magnets in invariable relation with respect to the potential magnets. The plate 22 is provided with slots 25 and the frame 4 is provided with apertures 26 directly in front of the slots 25, the said slots and apertures being provided for the reception of a screwdriver or other tool which may be used as a lever for adjusting the position of the plate 22. In order to effect the said adjustment, it is only necessary to remove the cover 2 and loosen the tap screws 23, by means of a screw-driver which may then be employed as a lever for moving the plate 22 by inserting its end through the apertures 26 and into the slots 25. After the desired adjustment has been effected, the screws 23 should be tightened so as to again securely clamp the parts together.

It will, of course, be understood that the frame 4 and the plate 22 may be provided with other tool-receiving means than the aperture 26 and slot 25 and that the meter may be otherwise so constructed as to render the load and potential magnets relatively adjustable without departing from the spirit of the invention.

In order that each of the distinct meter movements may be independent of the other in its operation and may not be affected by leakage from one set of magnets to the other, the base 1 of the casing is provided with a barrier 27 which is integral with the base and which extends between the load magnets 12, this barrier being composed of magnetic material which serves as a screen for leakage fluxes.

I claim as my invention:

1. A polyphase electric meter comprising a plurality of mechanically connected movable members, a plurality of magnets respectively associated therewith, and a common adjustable supporting member for the magnets.

2. In a polyphase electric meter, the combination with a frame carrying a plurality of movable members, and magnets respectively associated therewith, of other magnets also respectively associated with the movable members, and a common support therefor, the said frame and support being relatively adjustable.

3. In a polyphase electric meter, the combination with a frame having a recess and carrying a plurality of movable members and magnets respectively associated with the movable members, and a common support therefor set in the recess in the frame, the said frame and support being relatively adjustable.

4. In a polyphase electric meter, the combination with a frame carrying a plurality of movable members and magnets respectively associated therewith, of other magnets also respectively associated with the movable members, a common support therefor, the said frame and support being relatively adjustable, and adjustable means for securing the frame and support in relatively immovable relation.

5. In a polyphase electric meter, the combination with a plurality of movable members, and potential magnets respectively associated with the movable members, of load magnets also respectively associated with the movable members, and means for simultaneously adjusting the positions of the load magnets relatively to the potential magnets.

6. In a polyphase wattmeter, the combination with a plurality of movable members and potential magnets respectively associated with the movable members, of load magnets also respectively associated with the movable members, and a single means for effecting adjustment of the relative positions of the load and potential magnets.

7. In a polyphase electric meter, the combination with a frame having an aperture in its front face, a plurality of movable members mounted therein, and a plurality of potential magnets carried by the frame, of a plurality of load magnets, and a support therefor that is adjustable relatively to the frame and is provided with a tool-receiving portion opposite the aperture in the frame.

8. In a polyphase electric meter, the combination with a frame having an aperture in its front face, a plurality of movable members mounted therein, and a plurality of potential magnets carried by the frame, of a plurality of load magnets, a support therefor that is adjustable relatively to the frame and is provided with a tool-receiving portion opposite the aperture in the frame, and clamping means adjustable from the front of the frame for securing the potential and load magnets in relatively immovable relation.

9. In a polyphase electric meter, the combination with a frame, a plurality of movable members mounted therein and a plurality of potential magnets carried by the frame, of a plurality of load magnets, a support therefor that is adjustable relatively to the frame, and clamping means adjustable from the front of the frame for securing the load and potential magnets in relatively immovable relation.

In testimony whereof, I have hereunto subscribed my name this 31st day of May, 1911.

WILLIAM M. BRADSHAW.

Witnesses:
HAROLD B. TAYLOR,
B. B. HINES.